Sept. 16, 1947. T. B. MONTGOMERY 2,427,617
CONTROL SYSTEM FOR FURNACE ELECTRODE FEED
Original Filed May 7, 1943
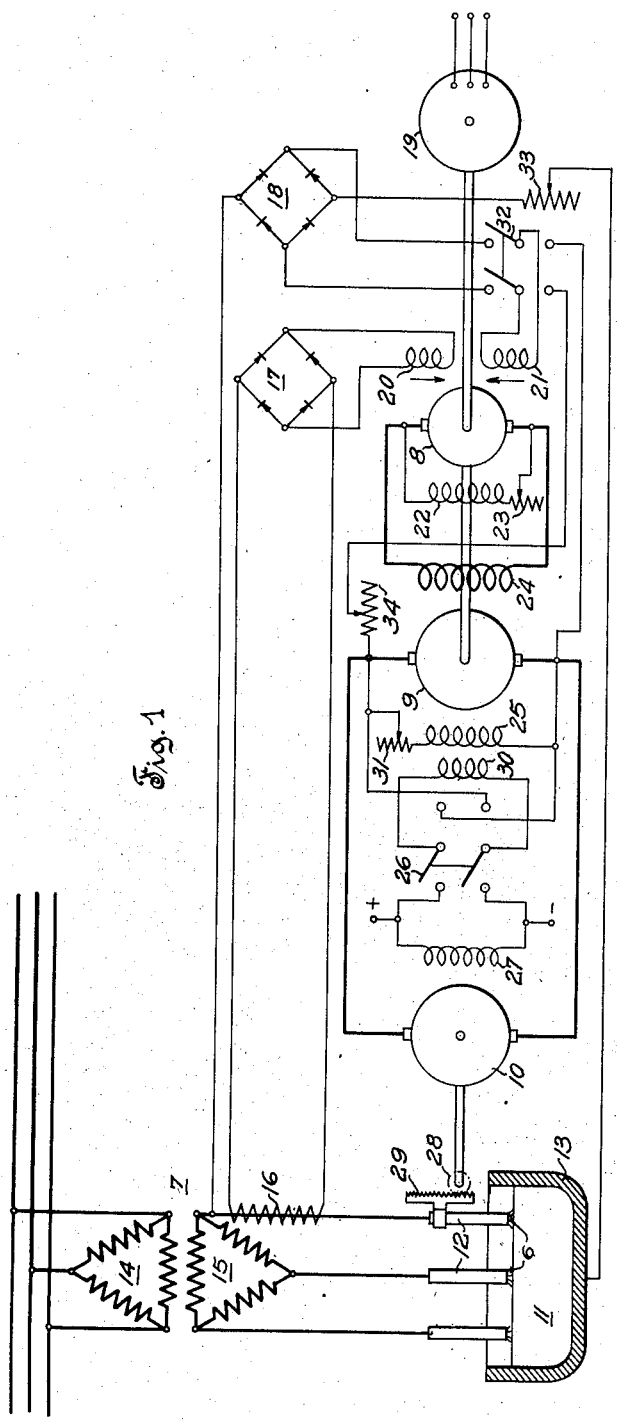
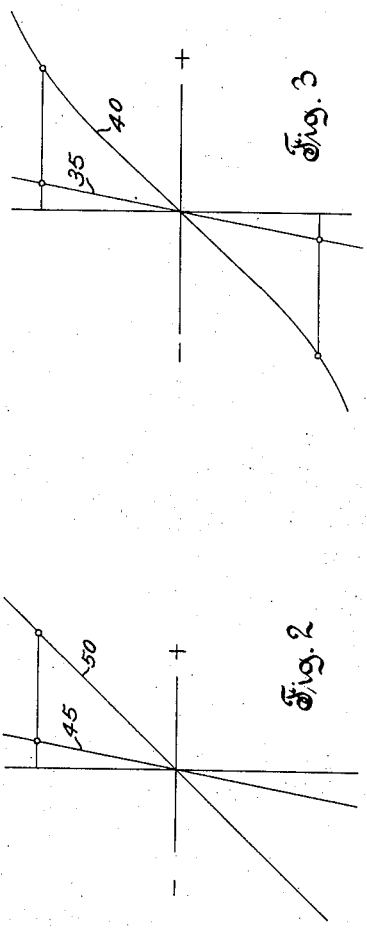
Inventor
Terryl B. Montgomery
by Harold A. Silver
Attorney Patented Sept. 16, 1947

2,427,617

UNITED STATES PATENT OFFICE 2,427,617

CONTROL SYSTEM FOR FURNACE ELECTRODE FEED

Terryl B. Montgomery, Wauwatosa, Wis., assignor to Allis-Chalmers Manufacturing Company, Milwaukee, Wis., a corporation of Delaware Original application May 7, 1943, Serial No. 486,048, now Patent No. 2,375,039, dated May 1, 1945. Divided and this application August 4, 1944, Serial No. 548,038

8 Claims. (Cl. 314—75)

This invention relates in general to control systems utilizing a generator as a regulator and relates particularly to the utilization of such a regulating generator in a system of control wherein the terminal voltage of the regulating generator is zero when the regulated quantity is at the desired normal value.

This application is a division of application Serial No. 486,048, filed May 7, 1943, with Terryl B. Montgomery, William M. Pickslay and Harold E. Reichert named as joint inventors, which application matured May 1, 1945, into U. S. Patent 2,375,039, in the name of Harold E. Reichert. In U. S. Patent No. 2,335,784, November 30, 1943, Terryl B. Montgomery, John F. Sellers and William M. Pickslay, a control system is disclosed utilizing a regulating generator having a variable terminal voltage when the regulated quantity is normal. A regulating generator having characteristics as disclosed in the above Patent 2,335,784 is not applicable in a control system where the terminal voltage of such generator is zero when the regulated quantity is normal.

It is therefor an object of the present invention to provide a control system with a regulating generator that will satisfactorily regulate when the generator terminal voltage is zero when the regulated quantity is normal.

In prior art control systems for controlling the position of an electrode in an arc furnace, variable voltage control of the electrode motor has been suggested for the purpose of avoiding contactors in the electrode motor circuit. The variable voltage generators of such systems were responsive to arc current balanced against a constant bias. This resulted in a regulating response that is not as rapid as is desirable and further caused undesirable regulating changes to be effected in some phases due to a sudden current in another phase. Other prior art systems suggested the use of the difference between arc current and arc voltage for initiating a regulating change. These systems utilized a differential relay, the contacts of which closed upon a given small differential to cause a regulating change. Such systems effected operation of the electrode motor at a constant speed and also permitted undesirable regulating changes in some phases.

It is therefore an object of the present invention to provide an arc furnace control system avoiding the above disadvantages and providing a new cooperation of control system elements whereby undesirable and unnecessary regulating changes are avoided.

It is a further object of the present invention to provide a control system for positioning an electrode in an electric arc furnace in which the electrode motor is controlled by a regulating generator the terminal voltage of which is substantially zero when the furnace characteristics are at the desired regulated value.

It is also an object of the present invention to provide in a control system for an arc furnace, a regulating generator having inductively related control elements responsive to characteristics of the arc furnace.

It is also an object of the present invention to utilize, in an arc furnace control system, a regulating generator having a shunt field circuit of a resistance such that the field resistance line lies to the left of the saturation curve.

It is a further object of the present invention to provide an arc furnace control system that has high amplification of and a fast response to a required corrective effort, but that will be unaffected by peak changes in momentary furnace characteristics.

It is a further object of the present invention to provide a control system for positioning an electrode in an arc furnace with a means for preventing drift of the electrode motor when the furnace characteristics are at the normal desired value and the electrode motor is supposedly de-energized.

It is also an object of this invention to provide an arc furnace control system that will effect melting and refining with less kilowatt hours per ton of steel than could be effected by prior art control systems.

Objects and advantages other than those above set forth will be apparent from the following description when read in connection with the accompanying drawing, in which:

Fig. 1 is a schematic diagram of connections of one form of a control system embodying the present invention;

Fig. 2 is a curve depicting characteristic features of the regulating generator shown in Fig. 1; and Fig. 3 is a curve depicting characteristic features of the generator supplying the electrode motor shown in Fig. 1.

The invention is illustrated in Fig. 1 in the form in which it may be utilized in a control system for positioning the electrodes in an arc furnace. The electrodes 12 of the furnace 11 are shown supplied with current from a transformer 7 having a secondary 15 connected to the electrodes and a primary 14 connected to any suitable alternating current supply line. The usual reactors and tap changes used with arc furnaces are omitted for simplicity of illustration. Each of the electrodes 12 is movable with respect to the "melt" or charge of material being refined which forms a common electrode for the arcs 6. Only the right hand electrode 12 has been illustrated as movable and the control system for such electrode only is shown. The other electrodes 12 are similarly movable and have a similar control system for each of such electrodes.

The electrode 12 is shown as having a rack 29 thereon cooperating with a gear 28 on the shaft of the electrode motor 10 to raise or lower the electrode as the motor 10 runs in one direction or the other. The motor 10 is energized by a generator 9, the field 24 of which is energized by a regulating exciter 8. The generator 9 and the exciter 8 are driven by any suitable means such as the alternating current motor 19.

Movement of an electrode 12 toward or away from the melt is effected in response to the relative values of the current through the arc 6 at that electrode and the voltage across that arc. When the values of the arc current and the arc voltage are at a predetermined relationship, the electrode is at the proper distance from the melt and the motor 10 is stopped. If the arc current or the arc voltage or both vary from the desired value, the electrode motor 10 is energized in the proper direction to raise or lower the electrode 12 in accordance with the corrective effort required. This corrective effort is applied to the electrode motor 10 through a two stage amplifying system formed by the machines 8 and 9.

Machine 9 has a shunt field 25 and the resistance of this shunt field circuit is controlled by the adjustable resistance 31 so that the characteristics of this field are as shown in Fig. 3. As will be seen from Fig. 3 the field resistance line 35 is to the left of the saturation curve 40 whereby the excitation due to field 25 only is insufficient to maintain terminal voltage on machine 9. The exciting generator 8 has a shunt field 22, the resistance of which is controlled by the adjustable resistance 23 so that the machine characteristics are as shown in Fig. 2. The characteristics of machine 8 are similar to those of the generator 9 in that the field resistance line 45 lies to the left of the saturation curve 50; however, it is preferable for additional accuracy that the magnetic structure of machine 8 is such that it operates only over the straight portion of the saturation curve 50. The terminal voltage of machine 8 will drop to zero if no other excitation is present.

The exciting generator 8 has two control fields 20 and 21. These control fields 20 and 21 are inductively related to each other and are opposed as indicated by the arrows. When the desired values of arc current and arc voltage are present in the furnace 11, the excitation provided by field 20 is equal and opposite to that provided by field 21 and the voltage of machine 8 thereupon drops to zero. The field 20 is connected to a bridge rectifier 17 energized by a current transformer 16 measuring the arc current through electrode 12. The field 21 is connected, when switch 32 is in its upper position, to a bridge rectifier 18 measuring the voltage across the arc 6 by connection to the furnace shell 13 and the lead of electrode 12. The desired relative values of arc current and arc voltage are controlled by the adjustable resistor 33 in the energizing circuit of the field 21. These desired relative values are changed as the charge of cold scrap progresses to a molten body and is refined.

In an arc furnace control system, the regulating problem is unusual because of the high degree of instability of the electrical current and power in the arc. Violent fluctuations in arc current occur as often as every six cycles near the beginning of a melt in a steel furnace, due to the rapidity of changes in ionization, the varying degree of rectification in the arc and the varying arc length. Obviously, it is impractical to move an electrode system, weighing a ton or more, fast enough to correct for such variations by controlling the arc length. However, the variation in average values of arc current and arc voltage may vary from maximum to minimum every one to two seconds, due to the melting away of the metal and the melting of the electrode which changes the arc length. A good regulating system must hold these average values to a minimum variation.

The exciting generator 8 is recognized as a power amplifier, for the control power, supplied by excess of one of fields 20 or 21 over the other, is a small percentage of the output delivered by machine 8 to field 24. For a small installation, only one stage of amplification would be necessary, and the generator 8 would supply the electrode motor 10 directly. In the usual size furnaces an added stage of amplification is desirable and this is provided, as in the system shown, by the generator 9.

The improved regulation in an arc furnace control system embodying the present invention is due to several factors. The actuation of the electrode motor 10 is controlled by a measure of arc or heating energy, that is, for any given setting of the adjustable resistance 33 and the taps (not shown) on transformer 7, the control system will hold a predetermined value of voltage across the current in the arc 6. By controlling in response to the differential between a predetermined arc current and a predetermined arc voltage, a faster response, dependent upon the arc energy, is obtained than could be obtained from a response due to current alone.

The corrective effort is proportional to the deviation from normal of the regulated quantity. In other words, the speed of motor 10 in making any regulating change, changes in direct proportion to the change of the differential between current in and voltage across the arc 6. This provides a faster control action when considerable change is necessary, and necessitates only a short period of regulation when a small amount of regulation is required. This control action is especially effective in combination with a regulator responsive to arc current and arc voltage.

A change in an arc current is usually accompanied by an opposite change in arc voltage. As the present regulator is responsive to the differential between arc current and arc voltage, a rapid response to average value changes is obtained. As the windings 20 and 21 are inductively related and opposed, the mutual inductance thereof is effective in preventing response to momentary peak value transients. This is especially effective during the refining period after the metal is completely liquefied and the melt simulates boiling. Transient changes in arc current are caused by bubbles in the melt which soon disappear and therefore require no regulating change for correction.

The present control system is particularly effective in the three phase furnace shown. As the electrodes operate independently of each other, one electrode may bore down through the cold scrap and a cave-in of the metal around the electrode may occur. This causes substantially a short circuit and the current through the arc at that electrode suddenly increases with an accompanying decrease in voltage across that arc. The electrodes of the other two phases may at this instant have a proper arc length and therefore need no regulating action. However, the current through these electrodes will be affected because of the delta connection of the secondary 15 of transformer 7. If the present control should be responsive to current alone, an unnecessary regulating change would be called for on the other phases. In the present control system, due to the fact that the fields 20 and 21 are voltage responsive as well as current responsive, any unnecessary change on the other electrodes due to the cave-in on the third electrode, is avoided or minimized. This advantage is especially effective in that the present corrective effort is proportional to the deviation from normal of the regulated quantity.

In some furnaces the electrodes 12 are counterbalanced thereby permitting a small size motor 10 for their operation. When furnaces are not so counterbalanced, the rack 29 and gear 28 may be so designed as to allow the electrodes to drift downward in case of loss of power and failure of the arc. For such electrode structures, an auxiliary field 30 is provided on generator 9. This field 30 would in such cases be connected by the switch 26, closed to the left as viewed in the drawing, whereby a small constant excitation is provided for generator 9 tending to run the electrode in the upward direction. In operation field 30 causes the voltage of generator 9 to rise quicker than it will decay, thus causing electrodes to raise quicker than they will lower.

On furnaces in which the electrodes 12 are counter-balanced, the electrode motor 10 may continue to run in a direction for which it has been energized, due to residual magnetism in the generator 9. For such furnaces the switch 27 is thrown to the right, as viewed in the drawing, thereby connecting the auxiliary field 30 in a reverse direction across the terminals of the generator 9 in the so-called "suicide" connection. Thus any remnant of magnetism in the machine 9 will be killed by the voltage produced at the terminals by such magnetism. To further provide against drift of the electrode motor in a direction to raise the electrode 10, especially when the control fields 20 and 21 are deenergized, the switch 32 may be moved to the lower position shown in the drawing. This will place any remnant voltage of the machine 9 across the control field 21 thereby providing a voltage at the terminals of machine 8 tending to more quickly kill the remnant voltage of machine 9. When this connection is used, the "suicide" connection of field 30 is unnecessary.

The excitation provided by the shunt fields of machines 8 and 9 may be any predetermined value as long as the lines 35 and 45 are to the left of the saturation curves 40 and 50 as shown in Figs. 2 and 3. In practice it has been found that values of shunt field excitation of from fifteen to twenty-five percent of the ampere turns, required for energization of motor 10, is satisfactory. These self-excited shunt fields 25 and 22 have two functions. First, the required energization supplied by the control fields 20 and 21 to the machine 8 and the energization supplied by the field 24 to the machine 9 will be less and therefore these fields are more sensitive to the needed correction. These self-excited fields 22 and 25 permit the voltages of machines 8 and 9 to rise to normal value more quickly than if such field were not provided and further cause the voltage across these machines to decay less rapidly than if such shunt fields were not provided. The rapid rise of voltage is desirable from the standpoint of obtaining fast response to a needed corrective change. A fast response is especially desirable when the electrode 12 bores down through the scrap in the furnace 11 and such scrap caves in on the electrode. The auxiliary field 30 of generator 9 functions in this regard when connected by switch 26 to the constant source energizing the field 27 of motor 10.

Other uses of the control exciter or regulating generator of the present invention will be apparent to those skilled in this art. Such generator has great utility in any "positioning" control or in any control system where the voltage of the regulating generator is at a constant value for a predetermined constant normal value of the regulated quantity.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a control system for an electric arc furnace provided with relatively movable electrodes adapted to have an arc drawn therebetween, motor means for moving one of said electrodes, a generator for supplying current to said motor, means for controlling said generator comprising a dynamoelectric machine provided with two opposed inductively related field windings, means connecting one of said field windings responsively to the current through said arc, means connecting the other of said field windings responsively to the voltage across said arc, and means comprising an auxiliary field winding on said generator connected in shunt to the armature thereof in a direction to decrease any voltage across said armature.

2. In a control system for an electric arc furnace provided with relatively movable electrodes adapted to have an arc drawn therebetween, motor means for moving one of said electrodes, a generator for supplying current to said motor, means for controlling said generator comprising a dynamoelectric machine provided with two opposed inductively related field windings, means connecting one of said field windings responsively to the current through said arc, means connecting the other of said field windings responsively to the voltage across said arc, and means for breaking said connection of said other of said field windings and for connecting the same across the armature of said generator.

3. In a control system for an electric arc furnace provided with relatively movable electrodes adapted to have an arc drawn therebetween, motor means for moving one of said electrodes, a generator for supplying current to said motor, a field for said generator having energizing means connected in shunt circuit to the armature thereof, the resistance of said shunt circuit having a predetermined value such that the field resistance line lies to the left of the saturation curve thereof, means for controlling said generator comprising a dynamoelectric machine provided with a field having energizing means connected in shunt circuit to the armature thereof, the resistance of said shunt circuit having a predetermined value such that the field resistance line lies to the left of the saturation curve thereof, said means for controlling said generator also comprising two opposed inductively related field windings, means connecting one of said field windings responsively to the current through said arc, and means connecting the other of said field windings responsively to the voltage across said arc, the energization provided by said shunt fields of said generator and said dynamoelectric machine being between 15% and 25% of the total energization of said machines at normal full voltage thereof.

4. In a control system for an electric arc furnace provided with relatively movable electrodes adapted to have an arc drawn therebetween, motor means for moving one of said electrodes, a generator for supplying current to said motor, means for controlling said generator comprising a dynamoelectric machine provided with two opposed inductively related field windings, means connecting one of said field windings responsively to the current through said arc, means connecting the other of said field windings responsively to the voltage across said arc, and a self-energizing field winding on said dynamoelectric machine connected to be energized in accordance with the energization of said dynamoelectric machine, said self-energizing field providing between 15% and 25% of the total energization of said dynamoelectric machine at normal full voltage thereof.

5. In a control system for an electric arc furnace provided with relatively movable electrodes adapted to have an arc drawn therebetween, motor means for moving one of said electrodes, a source for supplying energy to said motor means, said source including a dynamoelectric machine provided with two opposed inductively related field windings, means connecting one of said field windings responsively to the current through said arc, means connecting the other of said field windings responsively to the voltage across said arc, and a self-energizing field winding on said dynamoelectric machine connected to be energized in accordance with the energization of said dynamoelectric machine, said self-energizing field providing between 15% and 25% of the total energization of said dynamoelectric machine at normal full voltage thereof.

6. In a control system for an electric arc furnace provided with relatively movable electrodes adapted to have an arc drawn therebetween, motor means for moving one of said electrodes, means for controlling said motor comprising a dynamoelectric machine provided with two opposed inductively related field windings, means connecting one of said field windings responsively to the current in said arc, means connecting the other of said field windings responsively to the voltage across said arc, and means for breaking said connection of one of said field windings and for connecting the same responsively to the voltage across the armature of said dynamoelectric machine.

7. In a control system for an electric arc furnace provided with relatively movable electrodes adapted to have an arc drawn therebetween, motor means for moving one of said electrodes, a generator for supplying current to said motor, means for controlling said generator comprising a dynamoelectric machine provided with two opposed inductively related field windings, means connecting one of said field windings responsively to the current through said arc, means connecting the other of said field windings responsively to the voltage across said arc, and field winding means on said dynamoelectric machine connected to be energized in degree and direction dependent upon the value and direction of the output voltage of said dynamoelectric machine, said field winding means providing between 15% and 25% of the total energization of said dynamoelectric machine at normal full voltage thereof.

8. In a control system for an electric arc furnace provided with relatively movable electrodes adapted to have an arc drawn therebetween, motor means for moving one of said electrodes, a source for supplying energy to said motors, said source including a dynamoelectric machine provided with two opposed inductively related field windings, means connecting one of said field windings responsively to the current through said arc, means connecting the other of said field windings responsively to the voltage across said arc, and field winding means on said dynamoelectric machine connected to be energized in degree and direction dependent upon the value and direction of the output voltage of said dynamoelectric machine, said field winding means providing between 15% and 25% of the total energization of said dynamoelectric machine at normal full voltage thereof.

TERRYL B. MONTGOMERY.

REFERENCES CITED

The following references are of record in the file of this patent:

UNITED STATES PATENTS

| Number | Name | Date |
|---|---|---|
| 2,221,610 | Santini | Nov. 12, 1940 |
| 2,295,395 | Formhals | Sept. 8, 1942 |
| 1,989,546 | Chapman (1) | Jan. 29, 1935 |
| 2,007,751 | Chapman (2) | July 9, 1935 |

OTHER REFERENCES

"Westinghous Engr.," May 1942 (reprint), pp. 1 and 2.

AIEE Technical Paper, 43-96, May, 1943, pp 3.